United States Patent [19]
Cragon

[11] 3,864,550
[45] Feb. 4, 1975

[54] CHARGE COUPLED DEVICE

[75] Inventor: Harvey George Cragon, Austin, Tex.

[73] Assignee: Texas Instruments Incorporated, Dallas, Tex.

[22] Filed: Feb. 27, 1974

[21] Appl. No.: 446,172

[52] U.S. Cl.... 235/61.11 E, 340/173 LS, 340/173 LM
[51] Int. Cl.... G06k 7/10, G11c 11/34, G11c 11/42
[58] Field of Search........ 235/61.11 E; 340/173 LT, 340/173 LS, 173 LM; 250/555, 566

[56] References Cited

UNITED STATES PATENTS 3,750,114 7/1973 Valassis........................ 340/173 LS

*Primary Examiner*—Daryl W. Cook
*Attorney, Agent, or Firm*—Harold Levine; James T. Comfort; Richard L. Donaldson

[57] ABSTRACT

The disclosure relates to a charge coupled device (CCD) reader capable of reading and buffer storing the data stored in a punched card. This is accomplished by providing a charge coupled imager which may be of standard design with frames arranged in a rectangular array to coincide with the regions in the card in which holes are capable of being punched. The total size of the frames on the charge coupled device imager can be made large enough relative to the focused image of the punched card so that rotational and translational misalignments of the card will not produce errors. The reader includes a card holder for properly aligning the card with respect to the frames of the imager and an optical source which includes a light and a lens or optical system to properly illuminate all of the possible hole locations on the punched card. In this way, light impinges on those frames of the imager wherein holes have been punched in the punched card, the imager then transforming the charges in the locations wherein light impinges to a buffer region of the CCD to provide the buffering function. The data can then be shifted out of the CCD buffer region in standard manner onto a transmission line or the like.

4 Claims, 2 Drawing Figures

CHARGE COUPLED DEVICE

Figure 1:
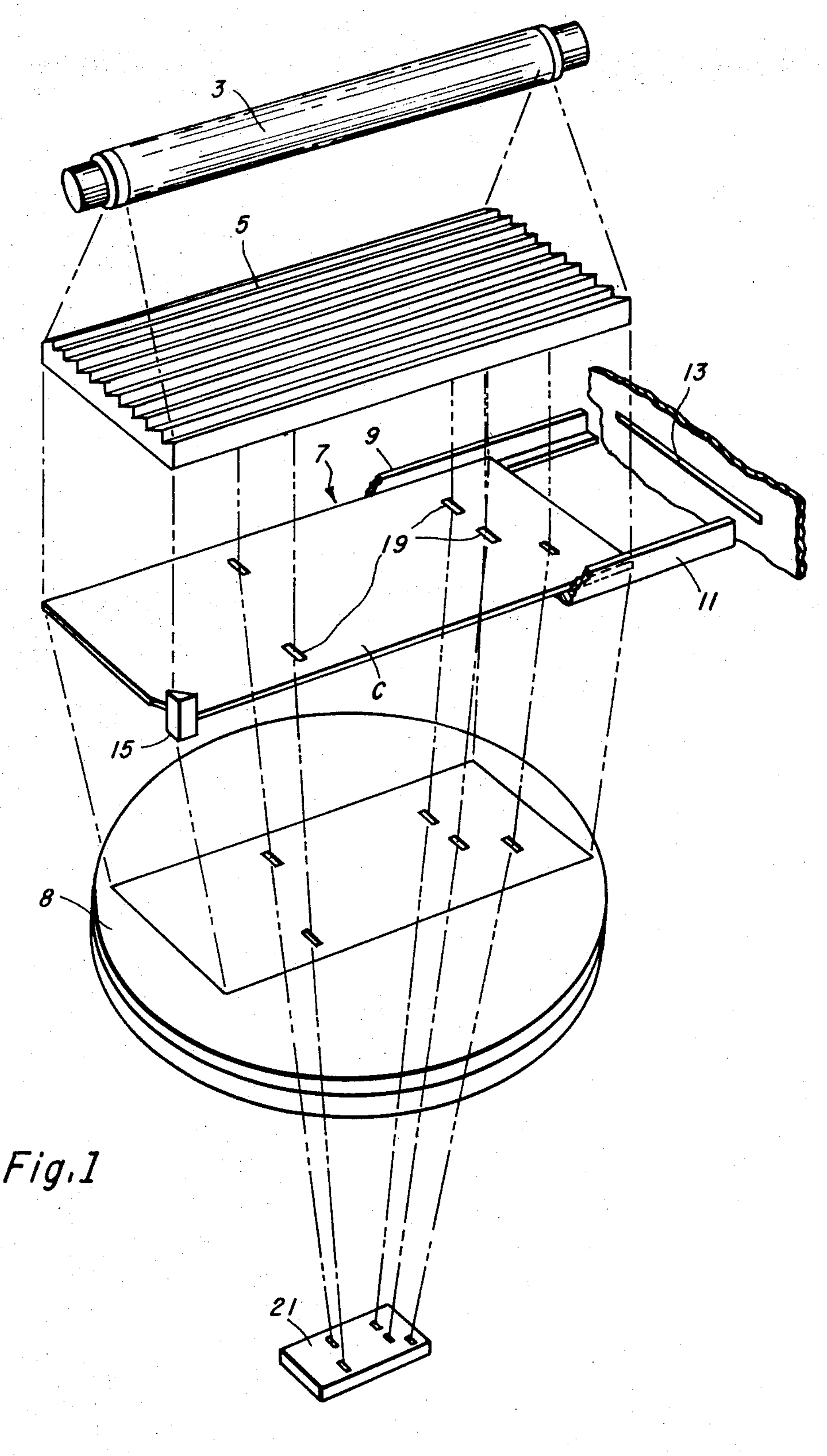

This invention relates to a charge coupled device (CCD) system for reading punched cards and, more specifically, to such a system which performs the combined functions of sensing the presence of holes in a card and buffering the data indicative of said holes.

Readers for punched cards, particularly of the type having hole positions in an 80 × 12 bit rectangular array have been well known in the art. These machines have been primarily of mechanical type utilizing electrical spring contacts which pass through the holes in the card, or a light source and a linear array of 12 photodiodes, to indicate those positions on the card wherein the holes are located. Punched card readers of this type must have, in addition to the electrical equipment which will sense the presence of the punched holes in the card, a buffer for storing the data for transmission onto a transmission line. It is therefore necessary to utilize two distinct types of equipment for providing the combined functions as above enumerated.

In accordance with the present invention, there is provided a single system which is capable of performing the combined functions of simultaneous sensing all holes in a punched card and then buffering the data in a storage device for transmission onto a transmission line. This is accomplished utilizing a charge coupled device imager which may be of known type in addition to a card holder for properly aligning the card to be read and a light source with suitable associated optical equipment.

Briefly the above is accomplished by utilizing a charge coupled imager with an optical integration section arranged in a rectangular array to coincide with the region of the card in which holes are capable of being punched. The size of the optical integration section on the charge coupled device imager can be made large enough relative to the size of the punched card image so that rotational and translational misalignments of the card will not produce errors. The reader includes a card holder for properly aligning the card with respect to the frames of the imager and an optical source which includes a light and a lens or optical system to properly illuminate all of the possible hole locations on the punched card. In this way, light impinges on the imager wherein holes have been punched in the punched card, the imager than transferring charges in the locations wherein light impinges to the read out store or buffer section to provide the buffering function. The data can then be shifted out of the CCD imager onto a transmission line or the like.

It is therefore an object of this invention to provide a charge coupled device imager system for reading a punched card.

It is further an object of this invention to provide a punched card reader capable of performing the combined functions of sensing the presence of punched holes and storing the sensed data from the punched holes sensed until transmission of such data onto a transmission line occurs.

It is the yet further object of this invention to provide a charge coupled device imager in combination with a light source and suitable optical system for reading punched cards and storing the punched data therein.

Figure 2:
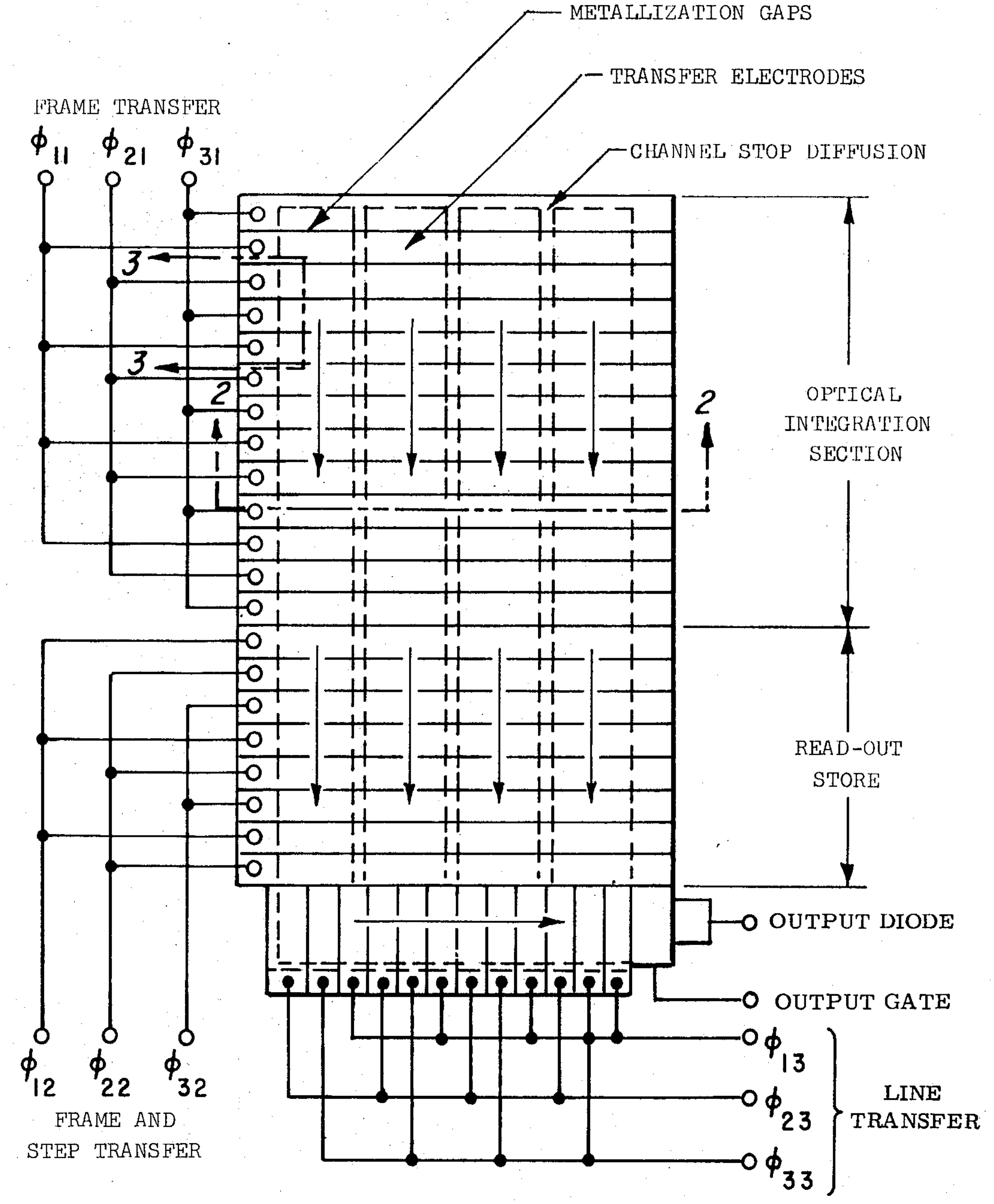

The above objects and still further objects of the invention will immediately become apparent to those skilled in the art after consideration of the following preferred embodiment thereof, which is provided by way of example and not by way of limitation, wherein:

FIG. 1 is a schematic diagram of a CCD punched card reader in accordance with the present invention; and FIG. 2 is a schematic diagram of a prior art charge-transfer image sensing array as set forth in the above noted prior art.

Referring now to FIG. 1, there is shown a charge coupled device card reader embodying the present invention. The device includes a housing 1 in which is positioned a lamp 3 and an optical system comprising lens 5 which spreads the light from the lamp 3 over the entire card region 7 so that the light travels in a direction normal to the plane of the card region 7. To properly position a card in the card region 7 there is provided a card holder including a pair of guides 9 and 11, the housing 1 also including a slot 13 for insertion of the card into the guides 9 and 11 and a bevelled corner 15 to mate with a similar bevelled corner on a card for proper positioning of the card within the card holding region 7. A focussing lens 8 is located below the card region 7. The card holder maintains a card located therein in a flat disposition so that light passing through holes in the card will be focussed by the lens 8 on the proper locations of the optical integration section of a charge coupled device imager 21 with which the holes are required to be aligned.

The card reader is operated by placing a card C through the slot 13 into the guides 9 and 11 until properly located by the bevelled corner 15, and then turning on the light 3 whereinupon the light passes through the holes in the card C, the light passing through the holes 19 in the card are focussed and impinge upon associated CCD imager 21. In the manner to be described hereinbelow, the light focussed on the CCD imager 21 will cause charges to be stored in the appropriate locations in the imager whereupon the imager stores sets of charges indicative of those locations in the card wherein holes have been punched.

Referring first to FIG. 2, there is shown a schematic diagram of the "frame-transfer" method of organizing a charge-transfer image sensing array as set forth in "Charge-Transfer Devices", M.F. Tompsett et al., Journal of Vacuum Science and Technology, Vol. 9, No. 4, July-August 1972. The array includes, in the optical integration section, frame transfer line for clocking pulses $\phi_{11}$, $\phi_{21}$, and $\phi_{31}$ which provide the well known three phases of transfer (as discussed in the above noted article) the metallization gaps, the transfer electrodes and the channel stop regions (conveniently formed by diffusion) between the rows of transfer electrodes. The portion of the array labeled "read-out store" includes frame and step transfer lines for clocking pulse inputs $\phi_{12}$, $\phi_{22}$, and $\phi_{32}$ as well as the line transfer lines for clock pulse inputs $\phi_{13}$, $\phi_{23}$ and $\phi_{33}$, an output diode and an output gate. In conjunction with the phase transfer signals, charge stored under designated electrodes in the optical integration section can be transferred in a shift register manner as is well known in the art into the read-out store section prior to read out through the output diode and the output gate.

The optical integration section of FIG. 2 would correspond to the charge coupled imager 21 which is positioned beneath the card region 7 shown in FIG. 1, the read-out store adding a buffering or storage operation wherein the data read from a card can be stored while a new card is being placed into the card holder. By appropriate application of the frame and step transfer clock pulses $\phi_{12}$, $\phi_{22}$ and $\phi_{32}$, the data in the read-out store can then be transferred to the output and then to a transmission line. Alternatively, the readout store can be eliminated and the data can be read out from the optical integration section directly by operation of the frame transfer clock pulses $\phi_{11}$, $\phi_{21}$, and $\phi_{31}$ storage taking place only where the charges have been accumulated in the appropriate frames.

It can be seen that there has been disclosed a system for reading cards having data punched therein by means of holes utilizing a charge coupled device imager which provides the simultaneous functions of sensing the presence of punched holes as well as storing the data prior to entry thereof onto a transmission line.

The specific operation of the CCD device will not be discussed herein since the operation thereof is well known in the art and fully described in the above-noted literature.

Though this invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A reader for reading information stored in cards by means of holes formed therein, which comprises:

a. means for holding punched cards with predetermined alignment, said cards having locations thereon in which holes have been formed in a predetermined patter;

b. a charge coupled imager having a plurality of frames; and c. means for directing light through said holes in the punched card and for focussing said light on corresponding frames of said charge coupled imager;

d. said frames of the charged coupled imager having a total area greater than the focussed area of the punched card.

2. A reader as set forth in claim 1 wherein said charge coupled imager includes an optical integration section and a read-out storage section and means for transferring data from said optical integration section to said read-out storage section.

3. A reader as set forth in claim 1 further including means for transferring data stored in said imager to an output transmission line.

4. A reader as set forth in claim 2 further including means for transferring data stored in said imager to an output transmission line.

* * * * *